(No Model.)
P. A. EMANUEL.
PROCESS OF AND APPARATUS FOR PREPARING ALUMINIUM SULPHIDE.
No. 463,143. Patented Nov. 17, 1891.
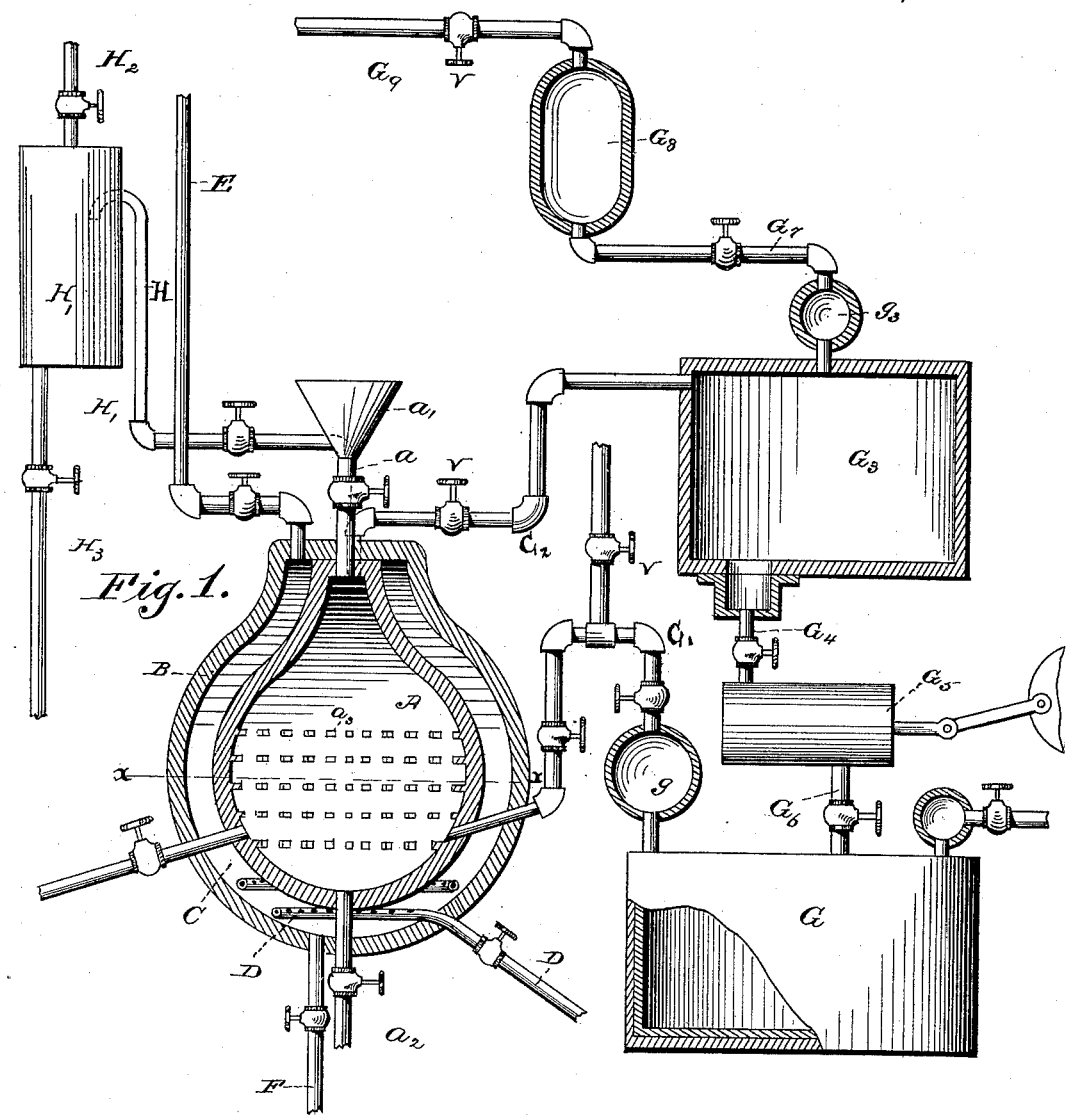
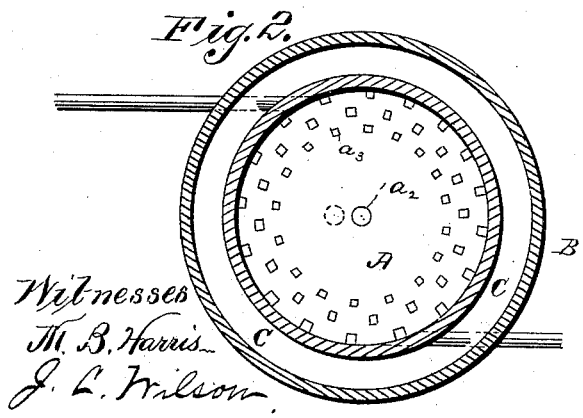

UNITED STATES PATENT OFFICE.

PHILIP ALBERT EMANUEL, OF AIKEN, SOUTH CAROLINA.

PROCESS OF AND APPARATUS FOR PREPARING ALUMINIUM SULPHIDE.

SPECIFICATION forming part of Letters Patent No. 463,143, dated November 17, 1891.

Application filed March 10, 1891. Serial No. 384,487. (No model.)

*To all whom it may concern:*

Be it known that I, PHILIP ALBERT EMANUEL, a citizen of the United States, residing at Aiken, in the county of Aiken and State of South Carolina, have invented certain new and useful Improvements in Processes of and Apparatus for Preparing Aluminium Sulphide; and I do hereby declare the following to be a full, clear, and exact description of the invention, such as will enable others skilled in the art to which it appertains to make and use the same.

My present invention relates to the preparation of the sulphides of aluminium from kaolin and other ores. The bonds uniting aluminium and sulphur being weaker than those uniting aluminium and oxygen, the sulphur is more easily split off than the oxygen, and hence the advantages of the sulphide over the oxide in reduction is apparent.

In a prior application, filed December 29, 1890, Serial No. 376,105, I have described a process for separating the kaolin into its component oxides—silica, alumina, and ferric oxide; and in this present application I start with either the aluminium sulphate or the alumina produced by means of that process, and from that sulphate or oxide of aluminium I obtain the sulphide, as will be hereinafter described.

My process consists, briefly, if beginning with the dry sulphate, in mixing the said sulphate with sulphur in a closed retort and heating the mixture, driving off $SO_2$ with a little free sulphur and reducing the $Al_2(SO_4)_3$ to $Al_2O_3$, probably, according to the reaction,

A small percentage of sulphate remains unaltered, but this amount is so small as to be unimportant. Now, still using the same retort, or any other if preferred, I treat the solid product remaining, almost wholly $Al_2O_3$, with carbon bisulphide under pressure. (It will be apparent that I may begin with the oxide instead of the sulphate, should that be more convenient.) The reaction

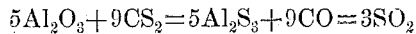

then takes place.

The CO and $SO_2$ go off, leaving aluminium sulphide; but a considerable portion of the $Al_2O_3$ ordinarily remains unchanged and inert. By using a suitable flux, as chloride of sodium or fluorides of sodium of potassium, however, a more complete conversion of $Al_2O_3$ into $Al_2S_3$ may be obtained.

This is my process, briefly. My method of accomplishing these results and of avoiding the numerous chemical and mechanical difficulties that suggest themselves will be better understood by reference to the accompanying drawings.

The same parts are indicated by the same letters.

Figure 1 represents a detail view, partly in section, of my apparatus. Fig. 2 represents a section of the retort along the line $x$ $x$ of Fig. 1.

A represents a retort of suitable material and capable of standing a high heat.

$a$ is the feed-pipe having funnel $a'$, and $a^2$ is the discharge-pipe for the sulphide of aluminium, slag, &c.

$a^3$ $a^3$, &c., represent jogs or teeth suitably secured on the interior of the retort A.

V V V, &c., represent ordinary stop-valves.

B represents an inclosing vessel or shell, which may be made of iron lined with fire-clay or with any fire-proof material.

In the fire-space C, I have a perforated spiral pipe D for supplying combustible gas or gases, which may be ignited within the closed combustion-chamber by means of an electric spark; but any other convenient means of heating the retort A may be adopted.

E represents an escape-pipe for the products of combustion from the chamber C, while F represents a drain-pipe for carrying off any residual products from the said combustion.

G represents a reservoir lined with "agate-ware," so called, where vapor, either carbon disulphide or sulphur, may be kept under pressure. The said reservoir is highly heated, but the source of heat is not shown.

G may have a dome or drum $g$, from which the pipe G' leads directly to the retort A. This pipe enters the retort in an inclined direction in order that a rotary motion may be imparted to the fluxed materials. All the pipes and other metallic connections of the said boiler are lined with agate-ware.

At the upper end of the retort A, I have a pipe $G^2$ for conveying the waste $SS_2$ fumes to the condensing-chamber $G^3$, whence by means of the pipe $G^4$, pump $G^5$, and pipe $G^6$ they may be forced back into the reservoir G, and so used over and over again. The condenser $G^3$ must be cooled in some way, and from the dome $g^3$ a pipe $G^7$ leads to a receiver $G^8$ for carbonic oxide or other gaseous products, while a pipe $G^9$ conducts these to any desired place of combustion or to any gas-escape.

From the top of the retort A, I have another pipe H, opening into a closed water-chamber H', and from the top of this chamber I have a pipe $H^2$ leading to a gas-escape.

$H^3$ is a drain-pipe for the tank H'.

Having thus generally described my apparatus, my process is as follows: All the valves leading to or from the retort A are closed, and then dried pulverized aluminium sulphate and sulphur intimately mixed are inserted into the retort through the funnel $a'$. The valve in the pipe H is then opened and the fire is started in C. As before stated, the sulphur present reduces the sulphate in A to oxide, driving off $SO_2$ with other gases due to impurities. The $SO_2$ is caught in the water-tank, forming $H_2SO_3$, which may be used for various purposes, while the foreign gases bubble up through the water and escape through the pipe $H^2$. This step of the process ends when the sulphate has been nearly all converted into the oxide. It will readily be seen, since the process so far has been to obtain the oxide, that if it be more convenient to prepare the oxide elsewhere and then place it in the retort A for reduction, the subsequent steps of the process will not be affected.

The next step in the process is the preparation of the sulphide of aluminium. Having the oxide of aluminium in the retort, either that which I have prepared there or that introduced from other sources, I may add sulphur or carbon to promote the reaction. Any suitable fluxes—for instance, fluor-spar and chloride of sodium—may also be added for the purpose of suspending the particles of oxide therein; but, as was before stated, I may use no flux. The retort A has all the while been maintained at a high heat. Having now prepared the $Al_2O_3$ for reduction into $Al_2S_3$, I close all other connections and turn on gradually the $CS_2$ vapor from G, and at the same time open the return-circuit $G^2$ to the condenser $G^3$, and start the pump $G^5$. The $SS_2$ in G, entering A, forms a coating of $Al_2S_3$ on the adjacent particles of $Al_2O_3$. As the $CS_2$ enters at an angle and under pressure it imparts a rotary motion to the charge, and in a little while a revolving mass of fused sulphide carrying oxide will form on the bottom of the retort and will rise higher and higher in it, the teeth $a^3$, acting as both knives and stirrers, tending not only to bring the carbon bisulphide into contact with all the particles of oxide, but also to knock off particles of the sulphide coating and allow the $CS_2$ to attack the unaltered $Al_2O_3$ afresh. The excess of $CS_2$ is condensed in $G_8$, whence it is forced by the pump $G^5$ back to the reservoir G. The carbonic oxide formed is withdrawn from the apparatus after the condensation of the $CS_2$ by suitably-set pop-valves. (Not shown.) I may also convert $Al_2O_3$ into $Al_2S_3$ by mixing intimately $Al_2O_3$ with excess of carbon and then placing the mixture in the retort A, where, instead of $CS_2$ vapor, I inject from G a stream of vaporized sulphur under pressure. This sulphur unites with the carbon in the retort to form $CS_2$, which in turn converts the $Al_2O_3$ into $Al_2S_3$. By either method a proportion of $Al_2O_3$ remains unchanged in the retort; but this is inert, does not perform any important function, and does not materially affect the reduction of the sulphide to the metal. Having reduced a large proportion of the $Al_2O_3$ to $Al_2S_3$ the pipe G' is closed, and by means of the pump $G^5$ the $CS_2$ in the retort A is pumped out and the molten sulphide may be either drawn off or treated for the metal in the same retort.

I do not wish to limit myself to the exact details of the apparatus described and claimed, as many modifications would readily suggest themselves to one skilled in the art which could be used without departing from the spirit of my invention.

Having thus described my invention, what I claim, and desire to secure by Letters Patent of the United States, is—

1. The process of reducing aluminium sulphate to sulphide, which consists in mixing the dried sulphate with sulphur, heating the mixture, and then treating the residual product with carbon bisulphide, substantially as described.

2. The process of reducing aluminium sulphate to sulphide, which consists in mixing the dried sulphate with sulphur, heating the mixture, and then treating the residual product with carbon bisulphide injected under pressure, substantially as described.

3. The process of reducing aluminium sulphate to sulphide, which consists in mixing the dried sulphate with sulphur, heating the mixture, and then treating the residual product with carbon bisulphide injected at an acute angle to the interior surface of the retort and under pressure, substantially as described.

4. In an apparatus for reducing aluminium sulphide from its oxide, a retort, with means of heating the same, in combination with a reservoir for compressed carbon-bisulphide vapor connected to the base of said retort, a receiver artificially cooled for the excess of carbon-bisulphide vapor, connected to the top of said retort, a gas-receiver connected to the said carbon-bisulphide receiver, and a pump and pipes connecting the reservoir and receiver for carbon bisulphide, substantially as described.

In testimony whereof I affix my signature in presence of two witnesses.

PHILIP ALBERT EMANUEL.

Witnesses:
P. WEEKS,
E. S. HAMMOND.